United States Patent
Chang

(10) Patent No.: US 7,988,528 B2
(45) Date of Patent: Aug. 2, 2011

(54) APPARATUS AND METHOD FOR GRINDING THREADED PORTION OF WORKPIECE

(75) Inventor: Chia-Chun Chang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 483 days.

(21) Appl. No.: 12/170,776

(22) Filed: Jul. 10, 2008

(65) Prior Publication Data
US 2009/0170402 A1    Jul. 2, 2009

(30) Foreign Application Priority Data
Dec. 28, 2007  (CN) .......................... 2007 1 0203528

(51) Int. Cl.
*B24B 49/00*    (2006.01)
*B24B 51/00*    (2006.01)

(52) U.S. Cl. ............... 451/5; 125/16.01; 451/9; 451/10; 451/48; 451/304

(58) Field of Classification Search ............... 125/13.01, 125/16.01, 16.02, 21; 451/5, 8, 9, 10, 48, 451/64, 178, 296, 304
See application file for complete search history.

(56) References Cited

U.S. PATENT DOCUMENTS
2,714,790 A * 8/1955 Lindenborg .................. 451/533
3,850,215 A * 11/1974 Orlomoski .................... 411/311
7,118,446 B2 10/2006 Walsh et al.

FOREIGN PATENT DOCUMENTS
EP          67232 A1    12/1882
GB       1304662 A      1/1973
* cited by examiner

*Primary Examiner* — Timothy V Eley
(74) *Attorney, Agent, or Firm* — Andrew C. Cheng

(57) ABSTRACT

An apparatus for grinding a threaded portion of a workpiece, is provided. The threaded portion has a spiral groove formed therein. The apparatus includes a motor, a grinding cord, a detector and a controller. The motor has a rotary portion for rotating the threaded portion of the workpiece about an axis. The grinding cord is configured for being looped around the threaded portion of the workpiece with a middle part thereof engagingly received in a given portion of turns of the spiral groove for grinding the thread portion of the workpiece. The detector is for detecting a rotating cycle of the rotary portion. The controller is communicatively coupled to the detector for controlling the rotary portion to selectively rotate in a first rotating direction or in a reverse second rotating direction based on the received signal from the detector.

7 Claims, 1 Drawing Sheet

APPARATUS AND METHOD FOR GRINDING THREADED PORTION OF WORKPIECE

BACKGROUND

1. Technical Field

The present invention relates to thread grinding apparatuses, and particularly, to an apparatus and a method for grinding a threaded portion of a workpiece.

2. Description of Related Art

Workpieces having threaded portions, such as inserts and screws, are in common use. Such a workpiece is used to help molding a threaded hole or to engage with a preformed threaded hole.

A threaded portion has a plurality of thread teeth and a spiral groove between the thread teeth. When the spiral groove is not in a right size, or the spiral groove can not successfully engage with thread teeth in a preformed threaded hole, grinding the spiral groove is needed.

Conventionally, the threaded portion to be grinded is fixed on a worktable, and a grinding cord is arranged on the threaded portion to carry out the grinding process. The grinding cord rotates to grind the spiral groove. However, as the grinding cord is pliable, it is difficult to hand two ends of the grinding cord and simultaneously rotate the grinding cord.

What is needed, therefore, is an apparatus and a method for grinding a threaded portion of a workpiece, which overcomes the above shortcomings.

SUMMARY

An exemplary apparatus for grinding a threaded portion of a workpiece, is provided. The threaded portion has a spiral groove formed therein. The apparatus includes a motor, a grinding cord, a signal transmitter, a signal receiver and a controller. The motor has a rotary portion for rotating the threaded portion of the workpiece about an axis. The grinding cord is configured for being looped around the threaded portion of the workpiece with a middle part thereof engagingly received in a given portion of turns of the spiral groove for grinding the thread portion of the workpiece. The signal transmitter is attached on the rotary portion for transmitting a signal representative of a rotating cycle of the rotary portion. The signal receiver is for receiving the signal. The controller is communicatively coupled to the signal receiver for controlling the rotary portion to selectively rotate in a first rotating direction or in a reverse second rotating direction based on the received signal.

Other advantages and novel features of the present apparatus will become more apparent from the following detailed description of embodiment when taken in conjunction with the accompanying drawing.

BRIEF DESCRIPTION OF THE DRAWING

Many aspects of the apparatus can be better understood with reference to the following drawing. The components in the drawing are not necessarily drawn to scale, the emphasis instead being placed upon clearly illustrating the principles of the present apparatus.

The drawing is a schematic view of an apparatus for grinding a threaded portion of a workpiece in accordance with an embodiment of the present disclosure.

DETAILED DESCRIPTION OF THE EMBODIMENT

Figure 1:
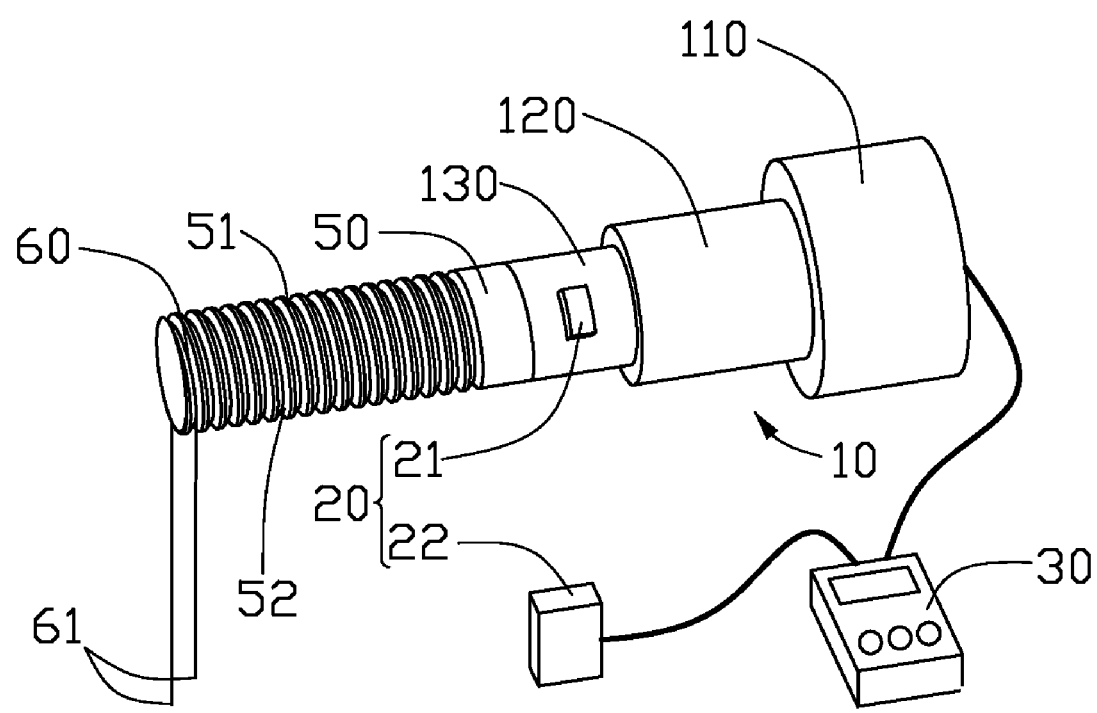

Embodiments of the present apparatus and method will now be described in detail below and with reference to the drawing.

Referring to the drawing, an apparatus for grinding a threaded portion of a workpiece 50, is provided. The apparatus includes a motor 10, a detecting device 20, a controller 30 and a grinding cord 60.

The threaded portion of the workpiece 50 has a plurality of thread teeth 51 formed thereon and a spiral groove 52 between the thread teeth 51. The spiral groove 52 needs to be grinded.

The motor 10 mainly includes a stator 110 and a rotator 120. The rotator 120 is driven by the stator 110. The rotator 120 has an output shaft 130 attached thereon.

The detecting device 20 includes a signal transmitter 21 and a signal receiver 22. The signal transmitter 21 is a signal wireless transmitter, and the signal receiver 22 is a signal wireless collector. The signal transmitter 21 is separately attached on the output shaft 130. The signal transmitter 21 is configured for transmitting a signal representative of a rotating cycle of the output shaft 130. The signal receiver 22 is configured for receiving the signal from the signal transmitter 21, and recording the number of the signal. The detecting device 20 helps to check rotations of the rotator 120 and the output shaft 130.

The controller 30 is communicatively coupled to the signal receiver 22 and the motor 10. The controller 30 is configured for controlling the output shaft 130 to selectively rotate in a first rotating direction or in a reverse second rotating direction based on the received signal.

The grinding cord 60 is a pliable cord with a grinding material thereon. A material of the pliable cord can be cotton. Two ends of the grinding cord 60 can be fixed on a worktable (not shown).

A method for grinding the threaded portion of the workpiece 50 using the thread grinding apparatus can be described as follows:

(1) attaching the workpiece 50 onto the output shaft 130;

(2) looping a grinding cord 60 around the threaded portion with a middle part thereof engagingly received in the first turn of the spiral groove 52;

(3) rotating the threaded portion of the workpiece 50 clockwise;

(4) detecting whether the clockwise rotation cycles of the output shaft 130 equals to the number of turns of the spiral groove 52; if yes, (5) rotating the threaded portion of the workpiece 50 counterclockwise;

(6) detecting whether the counterclockwise rotation cycles of the output shaft 130 equals to the number of turns of spiral groove 52; if yes, (7) stopping the motor 10 to identify the grinding of the thread portion of the workpiece 50.

Due to pliableness of the grinding cord 60, the grinding cord 60 leaned against the first turn of the spiral groove 52 can move to the next second turn of the spiral groove 52 during rotation of the threaded portion of the workpiece 50, thereby achieving the grinding of the workpiece 50. After grinding the workpiece 50 in a counterclockwise direction, trace of the grinding in a clockwise direction can be removed.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An apparatus for grinding a threaded portion of a workpiece, the threaded portion having a spiral groove formed therein, the apparatus comprising:

a motor having a rotary portion for rotating the threaded portion of the workpiece about an axis;

a grinding cord for being looped around the threaded portion of the workpiece with a middle part thereof engagingly received in a given portion of turns of the spiral groove for grinding the threaded portion of the workpiece;

a signal transmitter attached on the rotary portion for transmitting a signal representative of rotating cycle of the rotary portion;

a signal receiver for receiving the signal; and a controller communicatively coupled to the signal receiver for controlling the rotary portion to selectively rotate in a first rotating direction or in a reverse second rotating direction based on the received signal.

2. The apparatus as described in claim 1, wherein the motor comprises a stator and a rotator driven by the stator, the rotator having an output shaft serving as the rotary portion.

3. The apparatus as described in claim 1, wherein the grinding cord is a pliable cord with a grinding material thereon.

4. The apparatus as described in claim 3, wherein two ends of the grinding cord are fixed relative to the stator.

5. The apparatus as described in claim 1, wherein the signal transmitter and the signal receiver are wirelessly connected to each other.

6. A method for grinding a threaded portion of a workpiece, the threaded portion having a spiral groove formed therein, the method comprising:

attaching a workpiece onto a rotary portion of a motor;

looping a grinding cord around the threaded portion with a middle part thereof engagingly received in a given portion of turns of the spiral groove;

rotating the workpiece in a first rotating direction;

detecting whether rotation cycles in the first rotating direction of the rotary portion equal to the number of the turns of the spiral groove; if yes, rotating the workpiece in a reverse second rotating direction;

detecting whether rotation cycles in the second rotating direction of the rotary portion equals the number of the turns of the spiral groove; if yes, stopping rotation of the motor.

7. An apparatus for grinding a threaded portion of a workpiece, the threaded portion having a spiral groove formed therein, the apparatus comprising:

a motor having a rotary portion for driving the threaded portion of the workpiece to rotate about an axis;

a grinding cord for being looped around the threaded portion of the workpiece with a middle part thereof engagingly received in a given portion of turns of the spiral groove and the other parts thereof extending away from the threaded portion;

a detector for detecting a rotating cycle of the rotary portion; and a controller communicatively coupled to the detector for controlling the rotary portion to selectively rotate in a first rotating direction or in a reverse second rotating direction based on the rotating cycle of the rotary portion.

* * * * *